P. I. SCHOPP.
Boiler for Heating Rooms.

No. 95,735.

2 Sheets—Sheet 1.

Patented Oct. 12, 1869.

P. I. SCHOPP.
Boiler for Heating Rooms.

No. 95,735.

2 Sheets—Sheet 2.

Patented Oct. 12, 1869.

Witnesses,

Inventor.

United States Patent Office.

PH. I. SCHOPP, OF LOUISVILLE, KENTUCKY.

Letters Patent No. 95,735, dated October 12, 1869.

BOILER FOR HYDRATING THE ATMOSPHERE OF APARTMENTS.

The Schedule referred to in these Letters Patent and making part of the same.

Be it known that I, PH. I. SCHOPP, of the city of Louisville, in the county of Jefferson, and State of Kentucky, have invented a new and useful "Steam-Apparatus," to effect the Hydration of Air in Apartments; and I do hereby declare that the following is a full, clear, and exact description of the construction and operation of the same, reference being had to the annexed drawings, making a part of this specification, in which—

Figure 1:
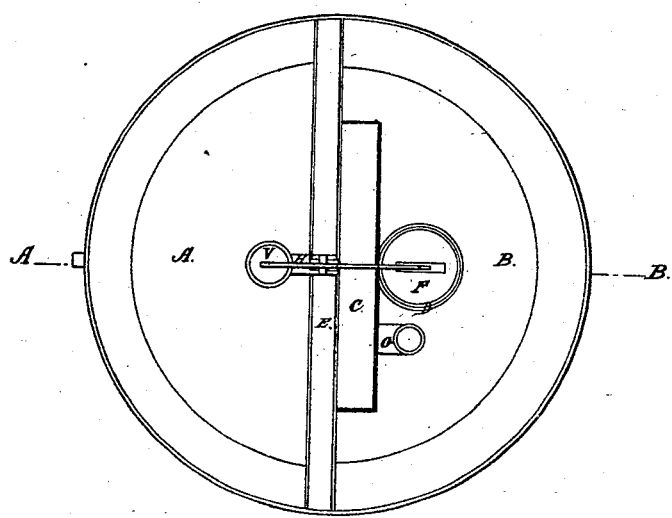
Figure 2:
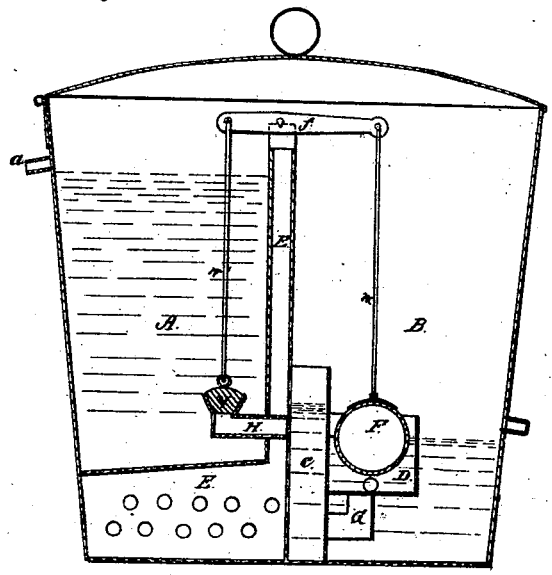
Figure 3:
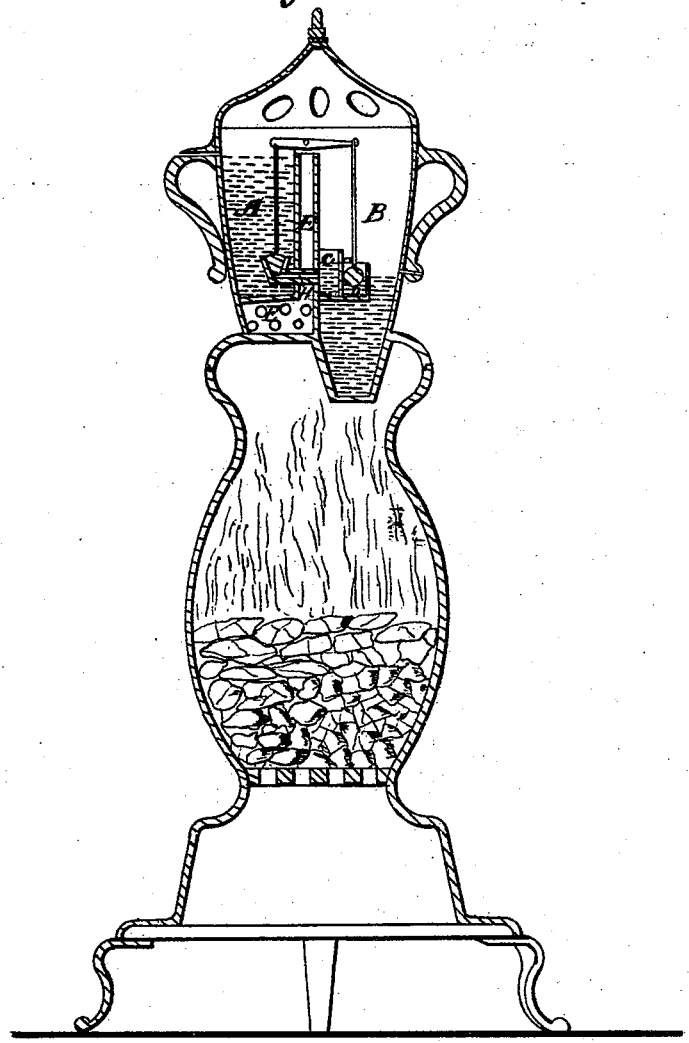

Figure 1 is a ground plan;
Figure 2, a transverse section;
Figure 3, also a transverse section.

The apparatus is composed of a metallic cup, divided into the following parts:

A, reservoir.
B, steam-chamber.
C, forebay.
D, protecting cylinder.
E, air-chamber.
F, float.
G, vertical pipe.
H, horizontal pipe.
V, conical valve.
$a\ a'$, waste-pipes.

Steam-chamber B is connected by pipe G with the forebay C, and the forebay, by pipe H and valve V, with the reservoir A.

The float F connects, through the wires $w\ w'$ and balance-beam $f$, with valve V.

The steam-chamber B is separated from the reservoir by air-chamber E.

The float F is a ball, made of wood, or of any other suitable material. Balance-beam $f$ and wires $w\ w'$ to be of brass.

The weight on the side of the float is to be somewhat heavier than the weight on the side of the valve. This is effected by moving the pivot-point on the balance-beam $f$ from the point of equilibrium somewhat toward the side of the valve.

The pivot is to be "edge-shaped," to obey the slightest motion of the float.

The float moves in the cylinder D to keep it steady, and protected from the little waves caused by the rapid ebullition of the water, when the same is in a state of boiling.

The cup is covered by a lid, with opening, to allow the escape of steam.

The mode of operation is as follows:

Reservoir A is filled with water, which will enter, through pipe H, the forebay C, and, through pipe G, the steam-chamber B and protecting cylinder D. The float F is then raised, and consequently, the valve V shut, and thus the flow of water stopped. As soon as evaporation sets in, the water-level in steam-chamber B will be lowered, and with it the float; the valve V will open, and a fresh supply of water enter the forebay C and chamber B.

To prevent the sudden check to boiling water by the introduction of cold water, is the object of the forebay, in which the water will be truly warmed before entering the chamber B, so that the boiling-process can go on without interruption.

The square contents of the water-surface in chamber B, are to be fixed with a view to raise a certain amount of steam in a certain time.

To prevent the boiling of the water, it is separated from the steam-chamber B, and the action of the heat on the bottom-plate, by the air-chamber E. Through it a current of air will constantly pass, and keep the water in the reservoir at a lower temperature than in the chamber B. The reservoir is to be large enough to contain a supply of water for one day.

The apparatus is placed on top of a stove, and will work, when once set in operation, automatically, and with the regularity of clock-work.

The various chambers of the apparatus may be cast in an ornamental form on the top or side plates of a stove, and so form a part of it, as shown in fig. 3. This would make the apparatus more effective, and keep the water in constant ebullition.

The advantages of my apparatus are as follows:

First, it will supply the heated and consequently dry air of a closed apartment with the humidity necessary to the health of men.

Second, it will supply the air with the amount of moisture required only.

Third, it will supply vapor uninterruptedly, thus avoiding the old plan of filling up frequently a pan with cold water, and interrupt the evaporation of the same for some time.

What I claim, as my invention, is—

1. Connecting the reservoir A with air-chamber E, forebay C, and steam-chamber B, in combination with float F and valve V, when arranged to operate as herein described.

2. Connecting the apparatus in a permanent way with the top or sides of a stove, substantially as and for the purposes described.

PH. I. SCHOPP.

Witnesses:
GEO. R. EICHBAUM,
THOS. D. SEDGWICK.